Patented July 30, 1946

2,404,892

UNITED STATES PATENT OFFICE 2,404,892

SHELLAC MODIFIED RESIN

Milton J. Scott, Stamford, Conn., assignor to American Cyanamid Company, New York, N. Y., a corporation of Maine No Drawing. Application February 28, 1942, Serial No. 432,733

11 Claims. (Cl. 260—24)

This invention relates to the production of thermosetting resins of the aromatic amine-aldehyde type and is more particularly concerned with aniline formaldehyde resins.

This application is in part a continuation of an application Serial No. 421,484 filed December 3, 1941, by Schroy, Grabowski and Scott, now Patent No. 2,388,293 dated November 6, 1945.

The joint invention of Schroy, Grabowski and myself, as set forth in the specification and claims of the patent referred to above, relates to mixtures of triazine-formaldehyde resins and aromatic amine-aldehyde resins including shellac-modified aromatic amine-aldehyde resins, molding compositions comprising such resinous mixtures, and processes for preparing the molding compositions. Invention of the shellac-modified aromatic amine-aldehyde resinous compositions per se and their method of manufacture, as described and claimed in the present case, was made solely by me.

The aromatic amine-aldehyde resins such as aniline-formaldehyde, are essentially of the non-heat-setting type. Various expedients have been suggested to bring about polymerization of these resins to the infusible state but the proposed methods have met with generally indifferent success. The aniline-formaldehyde resins previously described are all essentially thermoplastic and not thermosetting.

I have found that the addition of shellac to the amine-aldehyde resin at some time prior to the final polymerization step permits the formation of a fusible resin which becomes infusible upon heating. My resin compositions belong to the class of thermosetting resins. The shellac may be added during the preparation of the amine-aldehyde resin or may be added to the fusible resin after it is formed. In order to obtain best fusing and curing properties, it is preferable that the molar ratio of aldehyde to amine be above about 3:4.

The following examples are given for purposes of illustration and not in limitation, the parts being given by weight unless otherwise stated.

EXAMPLE 1

A mixture of 30 parts shellac and 90 parts aniline is heated at a temperature of about 120° C., with agitation, until the shellac and aniline are reacted and a homogeneous composition is obtained. The solution is cooled to room temperature and 79.0 parts of formalin (37% formaldehyde by weight) is added slowly with agitation, the mixture being cooled so that the temperature rises slowly to about 90° C. The molar ratio of aniline to formaldehyde is 1:1. In its initial stage, the reaction is strongly exothermic and the temperature control is necessary. After the reaction is no longer strongly exothermal, an acid catalyst containing 0.7 part concentrated sulfuric acid in 18 parts water is added. The mixture is then heated to reflux and held at that temperature for about 1½ hours. The reaction product is cooled to about 70° C. and vacuum concentrated at 20½ inches of mercury until the temperature reaches 105° C. At this temperature, the vacuum is raised to 27–28 inches and concentration continued until the temperature reaches 120° C. After which the resin is poured into trays or the like and allowed to cool. The cooled resin is preferably ground and may then be subjected to such further operations as may be desired. The resin is a fusible solid having a melting point of about 74° C.

EXAMPLE 2

| | Parts |
|---|---|
| Aniline | 753 |
| Formalin (37% formaldehyde) | 662 |
| Concentrated sulfuric acid | 4.8 |
| Water | 120 |

This resin is prepared in the same manner as described for the resin in Example 1 except that, since no shellac is used, the initial step of reacting the shellac with the aniline is omitted. After the resin is formed there is added 1% to 25% of shellac, based on the weight of aniline used. The shellac may be reacted by mixing it with the hot, molten resin as it comes from the processing or it may be added at any subsequent time by re-melting the resin and dissolving the shellac in the molten mass. The resultant fusible resin is substantially identical with that prepared in accordance with Example 1.

EXAMPLE 3

A resin wherein the ratio of formaldehyde to aniline is 2.15:1, may be prepared in the same manner as described in Example 1, utilizing the following ingredients:

| | Parts |
|---|---|
| Aniline | 147 |
| Shellac | 49 |
| Formalin (37% formaldehyde) | 275 |
| Concentrated sulfuric acid | 1 |
| Water | 29 |

There is obtained a fusible resin of the same general nature as that of Example 1, except that the resin here prepared has a melting point of about 101° C.

Example 4

| | Parts |
|---|---|
| Aniline | 78 |
| m-p-Cresol | 30 |
| Formaline (37% formaldehyde) | 90 |
| Concentrated sulfuric acid | 0.6 |
| Water | 14 |

A resin is prepared from the above ingredients following the procedure given in Example 1 except that the cresol is added to the aniline in place of shellac and since solution is immediately obtained, the heating step for reacting the shellac is unnecessary. The resin obtained, while still in the molten condition, may be mixed with 1% to 25% of shellac based on the aniline, or the shellac may be added subsequently to the remolten resin.

In order to obtain thermo-setting of the aniline resins described, the final ratio of formaldehyde to aniline should be at least 2:1. Where the resin does not contain sufficient aldehyde, the deficiency should be made up before final polymerization and setting is attained. Under these conditions, the resin prepared in accordance with Example 1, when mixed with about 15% of its weight of paraform prior to curing, will set up to an infusible product in about 30 seconds at 150° C. The resin of Example 3 will set in about 75 seconds at 150° C. without the addition of paraform or other formaldehyde. The resins of Examples 2 and 4, after dehydration and the addition of shellac also set up in about the same times, with the addition of paraformaldehyde or formaldehyde from some other source.

In place of the paraform suggested for use with these resins, there may be substituted hexamethylenetetramine or another compatible resin containing combined formaldehyde such as urea-formaldehyde, dicyandiamide-formaldehyde, triazine-aldehyde, e. g., melamine-formaldehyde, etc.

In place of the sulfuric acid used as a catalyst in the above examples, I may use other inorganic or organic acids singly or in admixture. Suitable acids include hydrochloric, phosphoric, sulfamic, trichloracetic, formic, oxalic, etc. Likewise, it may sometimes be advantageous to use compounds or mixtures which develop acid under the conditions of reaction, i. e., acid chlorides, ammonium salts of strong acids and the like. In some cases the acid or equivalent substance may be omitted entirely or may be added subsequently. The acid material used, active or latent, serves to promote resinification and also influences the conversion of the resin from the fusible to the infusible form. In one modification of my process, the acidity of the reaction mixture may be neutralized or removed, as by washing, distillation of the acid, etc., and acid or latent acid catalyst may be added subsequently for the polymerization of the resin.

The shellac which is used in forming the resins is of acidic nature and may, itself, act as the catalyst.

Example 5

A mixture of 30 parts of shellac and 90 parts aniline is heated at a temperature of about 120° C., with agitation, until the shellac and aniline are reacted and a homogeneous composition is obtained. The solution is cooled to room temperature and 79.0 parts of formalin (37% formaldehyde by weight) is added slowly with agitation, the mixture being cooled so that the temperature rises slowly to about 90° C. The molar ratio of aniline to formaldehyde is 1:1. In its initial stage, the reaction is strongly exothermic and the temperature control is necessary. After the reaction is no longer strongly exothermal, the mixture is heated to reflux and held at that temperature for about 1½ hours. The reaction product is cooled to about 70° C. and vacuum concentrated at 20½ inches of mercury until the temperature reaches 105° C. At this temperature, the vacuum is raised to 27–28 inches and concentration continued until the temperature reaches 120° C. after which the resin is poured into trays or the like and allowed to cool. The cooled resin is preferably ground and may then be subjected to such further operations as may be desired. The resin is a fusible solid having substantially the same characteristics as the resin prepared in accordance with Example 1.

In place of an acidic catalyst, an alkaline catalyst may be used. In order to avoid affecting water resistance of the finished resin, it is preferred to use an alkaline material which is substantially water insoluble. Thus, calcium hydroxide is especially suitable for this purpose.

Example 6

A mixture of 30 parts of shellac and 90 parts aniline is heated at a temperature of about 120° C., with agitation, until the shellac and aniline are reacted and a homogeneous composition is obtained. The solution is cooled to room temperature and 79.0 parts of formalin (37% formaldehyde by weight) is added slowly with agitation, the mixture being cooled so that the temperature rises slowly to about 90° C. The molar ratio of aniline to formaldehyde is 1:1. In its initial stage, the reaction is strongly exothermic and the temperature control is necessary. After the reaction is no longer strongly exothermal, an alkaline catalyst prepared by slaking 0.7 part calcium oxide is added. The slaked lime in the form of a slurry is preferably freshly prepared just prior to use. The mixture is then heated to reflux and held at that temperature for about 1½ hours. The reaction product is cooled to about 70° C. and vacuum concentrated at 20½ inches of mercury until the temperature reaches 105° C. At this temperature, the vacuum is raised to 27–28 inches and concentration continued until the temperature reaches 120° C. after which the resin is poured into trays or the like and allowed to cool. The cooled resin is preferably ground and may then be subjected to such further operations as may be desired. The resin is a fusible solid having substantially the same characteristics as the resin prepared in accordance with Example 1.

Other aromatic amines can be substituted for the aniline, e. g., toluidines, diphenyl amines, phenylene diamines and the like. In place of the formaldehyde, other suitable aldehydes such as acetaldehyde, furfuraldehyde and the like may be used. The ratio of aldehyde to amine has an active influence on the properties of the resin. With an increase of the aldehyde amine ratio, the melting point of the resin will be found to increase. Thus, as noted in Example 1 where the formaldehyde:aniline molar ratio is 1:1, the melting point of the resin is about 74° C. In Example 3 where the process of production is the same but the molar ratio of formaldehyde to aniline is about 2:1, the melting point of the resin is about 101° C. The melting point of the resin is an important factor since it governs, to a large extent, the adaptability of the resin to further processing. The variation in melting point is illustrated in the following table wherein aniline-formaldehyde-shellac resins were prepared, in each case containing the same percentage of shellac but varying in the molar ratio of formaldehyde to aniline.

*Aniline-formaldehyde-shellac resins*

| Molar ratio of formaldehyde to aniline | ASTM ball and ring melting point centigrade (average) |
|---|---|
| | *Degrees* |
| 1.00:1 | 75 |
| 1.35:1 | 86 |
| 1.58:1 | 93 |
| 1.88:1 | 99 |
| 2.16:1 | 101 |
| 2.44:1 | 100 |
| 2.72:1 | 100.5 |

The amount of shellac which is used is not too critical since 1% to 50% of shellac may be used, based on the aniline content. With increasing amounts of shellac, faster polymerization of the resin is obtained. Even amounts of shellac in excess of 50% will do no harm but merely serve as diluent. When the shellac used represents about ⅓ of the weight of the aniline, the rate of cure or polymerization is generally most satisfactory for commercial operation.

The aniline resins of the present invention may be compounded with fillers to give heat hardenable molding compositions, the molded products having excellent insulating properties and alkali resistance. The molding compositions may be prepared by incorporating the resin with the filler on the hot differential rolls at temperatures of about 110°–115° C., in Banbury mills, or in other suitable mechanical mixing devices. Zinc stearate or other suitable lubricant as well as paraform or other desired source of formaldehyde may also be incorporated in the compounding operations.

For the production of molding compositions the resins may be compounded with any of the more commonly used fillers, alone or in admixture. Suitable fillers include cellulose, wood meal, mica, asbestos, celite and the like. These fillers are compounded with the resins to form homogeneous molding compositions. For the production of molding compositions suitable for use in molding articles having high impact strength the resins or molding compositions may be reinforced with such substances as canvas, asbestos, glass or the like, alone or combined in woven or spun form.

The molding compositions prepared as described are useful for molding under heat and pressure using the well-known compression technique. By altering the ratios of aldehyde to amine or by otherwise varying the procedure used for forming the resins, the heat setting properties of the resins may be altered so as to make the molding compositions suitable for transfer molding operations. Thus there are obtained aniline formaldehyde resins which are suitable for use with the quick molding technique using heat and pressure to give a molded article which may be removed from the hot mold without chilling. Due to their thermoplasticity the aniline formaldehyde resins previously available commercially required high pressures for molding and it was also necessary to chill the mold to harden the molded article prior to its removal from the mold. With my resins, by changing the formaldehyde:aniline ratios and/or by the use of suitable acid catalyzers it is possible to obtain free-flowing compositions of varying degrees of flow. Molding compositions may be prepared to produce perfect homogeneous moldings at pressures of 2000–4000 lbs./sq. in. with sufficiently rapid cure to permit of commercial utilization. Likewise, more free-flowing resins may be obtained which are suitable for laminating operations wherein pressures of 800–1250 lbs.-sq. in. are used.

In using my resins for the production of laminated articles the conventional laminating technique and conditions are suitable. The laminae may be of paper, asbestos paper, glass or asbestos cloth, canvas or suitable combinations of these. The resin may be applied as a solution or in the molten form. Since low melting resins may be obtained by variations in processing and proportions, as already described, the advantageous fusion technique is preferred since the resin may be applied to the laminae in the molten form, using rolls or the like, or the molten resin may be sprayed upon the surfaces of the laminae. The use of solvents is considered somewhat undesirable since it is necessary to remove the solvent before laminating and, unless the solvent is recovered, this operation is comparatively less economical than the fusion method. Furthermore, when solvents are used, the laminated product does not have as good electrical properties as is the case when no solvent is used.

The molded articles made with my resins, with or without fillers, etc., are characterized by their outstanding electrical properties. They have a low power factor as well as high arc resistance and dielectric strength. The dielectric properties of the molded article change very little with rise in temperature and, as a result, these molded articles are particularly suitable as high voltage insulators. In addition, the molded articles prepared from my compositions have outstanding alkali resistance. The resins of the present invention are obviously susceptible of other uses which will readily suggest themselves. Thus the oil-soluble aniline resins are suitable for the production of surface coating compositions wherein the resins add their desirable properties to the finished coating.

It will be obvious that other changes may be made in carrying out the invention without departing from the spirit and scope thereof as defined in the appended claims.

I claim:

1. The process which comprises reacting an aromatic amine having an NH₂ group attached to a benzene ring with shellac and an aldehyde in a molar ratio of at least about ¾ mol formaldehyde for each mol of amine until a fusible resin is formed, the shellac used not exceeding 50% by weight of the amine, the resin being thermosetting when it contains about 2 mols combined formaldehyde for each mol of amine.

2. The process which comprises reacting aniline with shellac and an aldehyde in a molar ratio of at least ¾ mol formaldehyde for each mol of aniline until a fusible resin is formed, the shellac used not exceeding 50% by weight of the aniline, the resin being thermosetting when it contains about 2 mols combined formaldehyde for each mol of aniline.

3. The process which comprises reacting shellac and aniline in a ratio not exceeding 1:2 by weight until a homogeneous composition is obtained, adding formaldehyde in an amount equivalent to at least ¾ mol for each mol of amine, reacting this mixture with cooling to prevent a rapid rise in temperature, and after the reaction is no longer strongly exothermal, continuing the reaction under reflux until there is formed a fusible resin, the resin being thermosetting when it contains about 2 mols combined formaldehyde for each mol of amine.

4. The process which comprises heating a fusible shellac-aniline-formaldehyde resin until an infusible product is formed, the formaldehyde combined in the product being equivalent to about 2 mols for each mol of aniline, and the shellac used not exceeding 50% by weight of the aniline.

5. A fusible resin composition comprising the reaction product of aniline with shellac and formaldehyde, the formaldehyde being present in an amount equivalent to at least ¾ mol for each mol of aniline, and the shellac used not exceeding 50% by weight of the aniline, the resin being thermosetting when it contains about 2 mols combined formaldehyde for each mol of aniline.

6. A fusible resin composition comprising an acid-catalyzed shellac-aniline-formaldehyde resin in which the formaldehyde is equivalent to at least ¾ mol for each mol of aniline, and the shellac used not exceeding 50% by weight of the aniline, the resin being thermosetting when it contains about 2 mols combined formaldehyde for each mol of aniline.

7. A fusible resin composition comprising an alkaline-catalyzed shellac-aniline-formaldehyde resin in which the formaldehyde is equivalent to at least ¾ mol for each mol of aniline, and the shellac used not exceeding 50% by weight of the aniline, the resin being thermosetting when it contains about 2 mols combined formaldehyde for each mol of aniline.

8. A heat-set infusible shellac-aniline-formaldehyde resin in which the combined formaldehyde is equivalent to about 2 mols for each mol of aniline, and the shellac used not exceeding 50% by weight of the aniline.

9. The process which comprises reacting aniline with shellac and an aldehyde in a ratio of at least ¾ mol formaldehyde for each mol of aniline, the shellac not exceeding 50% by weight of the aniline, and adding sufficient formaldehyde to combine with the aniline so that the total amount of combined formaldehyde is about 2 mols for each mol of aniline, whereby there is produced a fusible thermosetting resin.

10. The process which comprises reacting shellac with an aromatic amine having an $NH_2$ group attached to a benzene ring in a ratio not exceeding 1:2 by weight until a homogeneous composition is obtained, adding formaldehyde in an amount equivalent to at least ¾ mol for each mol of amine, reacting this mixture with cooling to prevent a rapid rise in temperature, and after the reaction is no longer strongly exothermal, continuing the reaction under reflux until there is formed a fusible resin, the resin being thermosetting when it contains about 2 mols combined formaldehyde for each mol of amine.

11. A fusible resin composition comprising the reaction product of an aromatic amine having an $NH_2$ group attached to a benzene ring with shellac and an aldehyde, the ratio of aldehyde to amine being at least ¾ mol of aldehyde for each mol of amine, and the shellac used not exceeding 50% by weight of the amine, the resin being thermosetting when it contains about 2 mols combined formaldehyde for each mol of amine.

MILTON J. SCOTT.